United States Patent
Goad et al.

[11] Patent Number: 5,365,977
[45] Date of Patent: Nov. 22, 1994

[54] PIPE SEAL

[75] Inventors: Robert L. Goad, Woodstock; Ronald G. Marotta, Antioch, both of Ill.

[73] Assignee: Northern Illinois Gas Company, Aurora, Ill.

[21] Appl. No.: 160,485

[22] Filed: Dec. 1, 1993

Related U.S. Application Data

[63] Continuation of Ser. No. 846,159, Mar. 5, 1992, Pat. No. 5,297,584.

[51] Int. Cl.$^5$ .......................................... F16L 55/168
[52] U.S. Cl. .................................. 138/99; 294/103.1; 414/741; 414/745.1; 414/912
[58] Field of Search ............... 138/97, 99; 29/402.09, 29/402.14, 402.19; 294/88, 103.1, 119.1; 414/741, 745.1, 912

[56] References Cited

U.S. PATENT DOCUMENTS

| | | | |
|---|---|---|---|
| 2,580,471 | 1/1952 | Smith | 414/912 |
| 2,666,541 | 1/1954 | Ferrario et al. | 294/88 |
| 3,171,419 | 3/1965 | Black | 29/402.09 |
| 3,178,793 | 4/1965 | Rosengarten, Jr. et al. | 138/99 |
| 3,180,672 | 4/1965 | Bjorklund et al. | 294/88 |
| 3,410,431 | 11/1968 | Vik | 294/88 |
| 3,438,523 | 4/1969 | Vik | 294/88 |
| 3,487,857 | 1/1970 | Lee | 138/99 |
| 3,586,057 | 6/1971 | Lambert | 138/99 |
| 3,598,347 | 8/1971 | Marburger . | |
| 3,685,545 | 8/1972 | Smith et al. | 138/99 |
| 3,744,822 | 7/1973 | Arnold | 138/99 |
| 3,863,976 | 2/1975 | Loch | 138/97 |
| 3,874,532 | 4/1975 | Metailler | 414/912 |
| 3,922,745 | 12/1975 | Lehman | 414/912 |
| 3,971,485 | 7/1976 | Hoppey | 294/88 |
| 4,030,746 | 6/1977 | Langowski | 294/88 |
| 4,094,423 | 6/1978 | Rogers | 294/88 |
| 4,268,217 | 5/1981 | Perreault et al. | 414/912 |
| 4,318,661 | 3/1982 | Helm | 294/103.1 |
| 4,375,345 | 3/1983 | Hanson | 414/722 |
| 4,535,822 | 8/1985 | Rogers, Jr. | 138/99 |
| 4,615,656 | 10/1986 | Geraghty, Jr. | 294/103.1 |
| 4,932,832 | 6/1990 | McCasland et al. | 414/732 |
| 4,951,990 | 8/1990 | Hollan et al. | 294/119.1 |
| 5,009,565 | 4/1991 | Esau | 294/88 |

*Primary Examiner*—David A. Scherbel
*Assistant Examiner*—Mark Spisich
*Attorney, Agent, or Firm*—Emrich & Dithmar

[57] ABSTRACT

Apparatus for covering an opening in a pipe and sealing a gas or fluid leak includes first and second pipe engaging blocks coupled to a frame. With the second block fixedly mounted to the frame and the first block movable along the frame by means of a hydraulic cylinder coupled thereto, the first block is positioned over and seals the leak under the force of hydraulic pressure. The frame includes first and second mounting arrangements for attaching an articulated boom such as on a backhoe to either an end of the frame (for positioning the apparatus in a generally upright orientation) or to an intermediate portion of the frame (for positioning the apparatus in an inclined orientation). The position of the second block along the length of the frame is adjustable depending upon the diameter of the pipe. A guide rod couples the movable first block to the frame to ensure linear displacement of the first block and proper alignment between the first and second blocks during engagement of the pipe. An attachment arrangement is also provided for mounting the apparatus to the entrenching bucket of a backhoe.

15 Claims, 3 Drawing Sheets

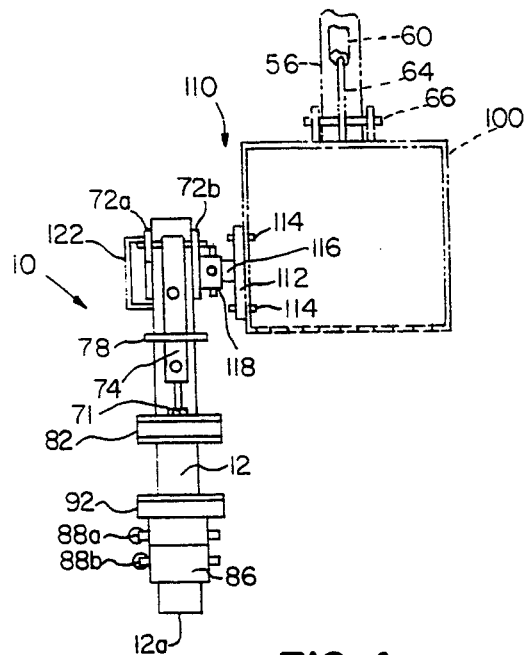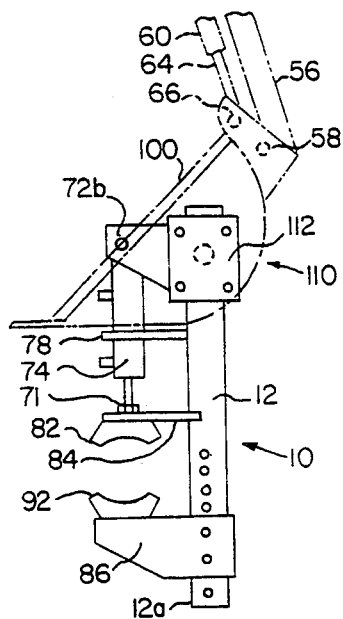
FIG. 4a
FIG. 4b
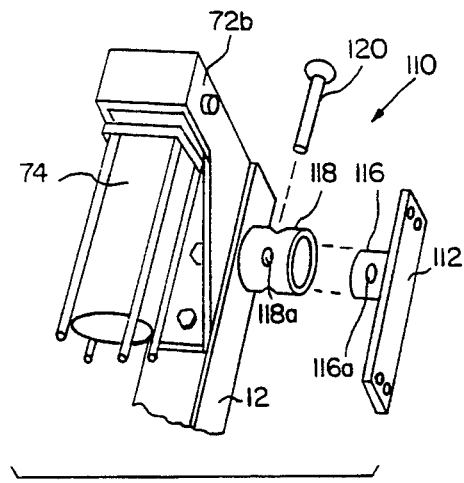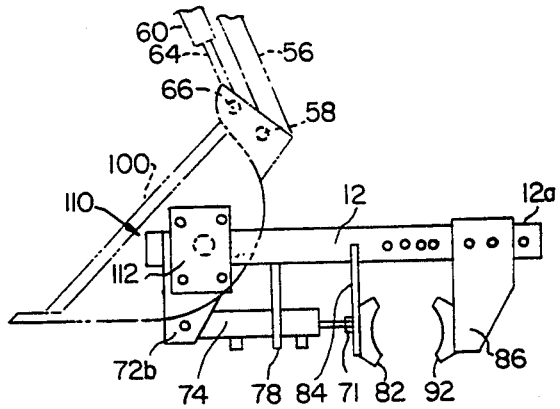
FIG. 4c
FIG. 4d

PIPE SEAL

This is a continuation of application Ser. No. 07/846,159, filed Mar. 5, 1992, U.S. Pat. No. 5,297,584.

FIELD OF THE INVENTION

This invention relates generally to apparatus for sealing off a gas or fluid leak in a pipe and is particularly directed to apparatus for remotely clamping off a leak in a pipe while allowing workers to remain a safe distance from the leak.

BACKGROUND OF THE INVENTION

Pipelines are used extensively in industry for the transport of gases and fluids under pressure. The integrity of these pipelines is of critical importance from an environmental, safety and economic perspective. Considerable effort and expenditures are made for the purpose of detecting and repairing leaks in these pipelines.

A prior art approach to repairing and sealing a pipeline leak makes use of a sealing gasket applied over the leaking portion of the pipe and a clamp for drawing and compressing the gasket in sealing engagement with the pipe. The gasket is relatively thin and when forced into position over the leaking hole in the pipe is generally in a highly stretched condition and is subject to rupture. The clamp used to position the gasket about the leak is generally comprised of various sections which require assembly and tightening by mechanical means before use. The assembly of the clamp delays sealing of the leak and allows for continued leakage of the gas or fluid.

U.S. Pat. No. 3,487,857 discloses a gas clamp for clamping and sealing off a leak in a gas or fluid carrying pipe. The clamp includes a pair of resilient force blocks, with one of the blocks coupled to and displaced by a hydraulic ram with a plunger. The gas clamp is handheld and includes a hand-operated pump in combination with a hydraulic fluid accumulator for pressurizing the hydraulic ram and displacing its plunger as well as the force block to which it is coupled. This clamping device requires manual manipulation and positioning by two workers who are positioned close to the gas or fluid leak and thus may be subject to considerable hazard.

The present invention addresses the aforementioned limitations of the prior art by providing a pipe seal for covering an opening in a pipe and sealing a gas or fluid leak which allows for remote manipulation and positioning of the sealing device for increased safety and ease of handling.

OBJECTS AND SUMMARY OF THE INVENTION

Accordingly, it is an object of the present invention to provide an improved clamping apparatus for sealing a leak in a pipe.

It is another object of the present invention to provide a pipe seal adapted for attachment to an articulated boom such as on a backhoe for sealing a leak in the pipe in a safe, secure manner without endangering workers.

Yet another object of the present invention is to provide apparatus for covering and sealing a gas or fluid leak in a pipe by applying a block comprised of a compressible, deformable sealing material over the leaking hole under the force of hydraulic pressure.

A further object of the present invention is to provide a hydraulic clamping apparatus for sealing a leak in a pipe which is adjustable for use with pipes having a range of diameters and which can be operated remotely from the site of the leak.

These objects of the present invention are achieved and the disadvantages of the prior art are eliminated by apparatus for sealing a leak in a pipe, the apparatus comprising: a frame; first and second mounting arrangements for attaching the frame to an articulated arm for maintaining the frame respectively either in an inclined or in a generally upright orientation, wherein the articulated arm provides support and allows for movement of the frame; first and second pipe engaging blocks, wherein the second pipe engaging block is fixedly attached to the frame; and a hydraulic cylinder mounted to the frame and coupled to the first pipe engaging block for positioning and applying pressure to the first pipe engaging block over a leak for sealing a leak in an upper or lower portion of a pipe where said frame is oriented generally upright and for sealing a leak in a lateral portion of a pipe when said frame is inclined.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 4a–4d are various views of an arrangement for mounting the pipe seal of the present invention to the entrenching bucket of a backhoe;

DETAILED DESCRIPTION OF THE PREFERRED EMBODIMENT

Figure 1:
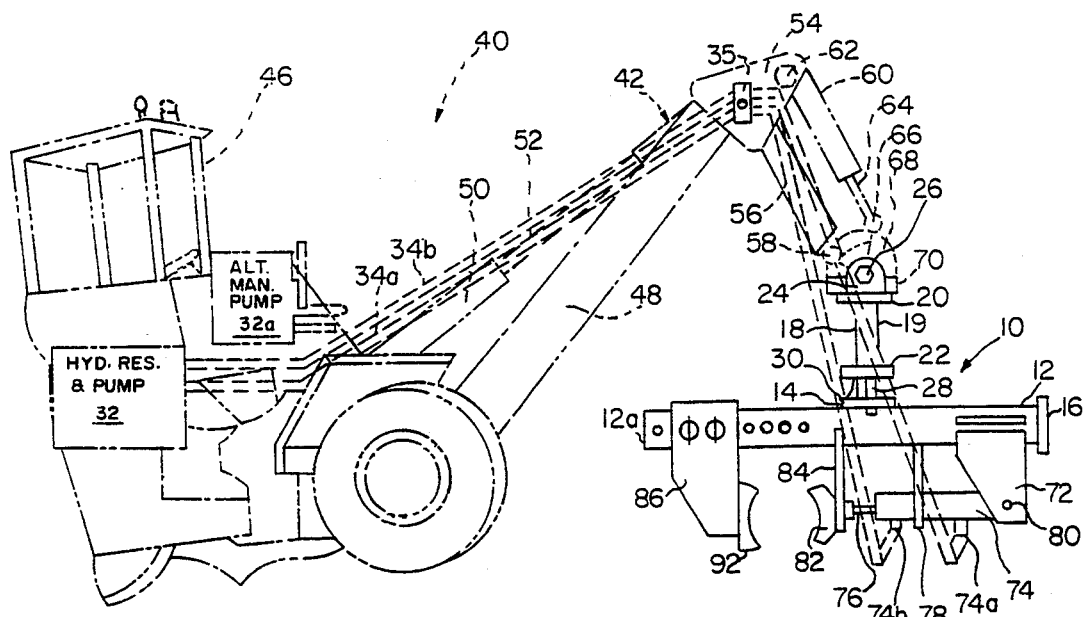
FIG. 1 is a side elevation view of a pipe seal in accordance with the present invention shown in a generally horizontal orientation and coupled to an end of an articulated support arm such as on a backhoe.
Figure 2:
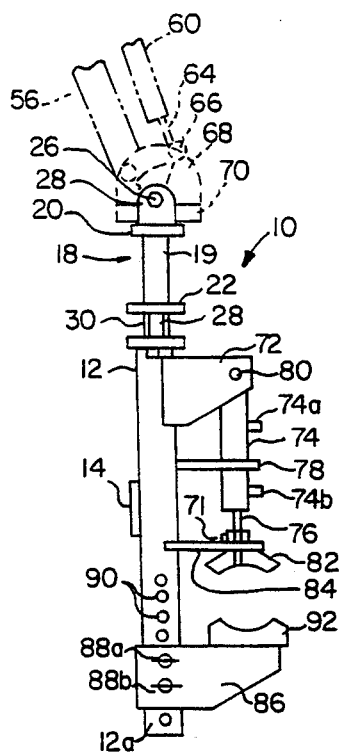
FIG. 2 is a side elevation view of the pipe seal of the present invention shown in a generally vertical orientation when coupled to an end of an articulated support arm.
Figure 3:
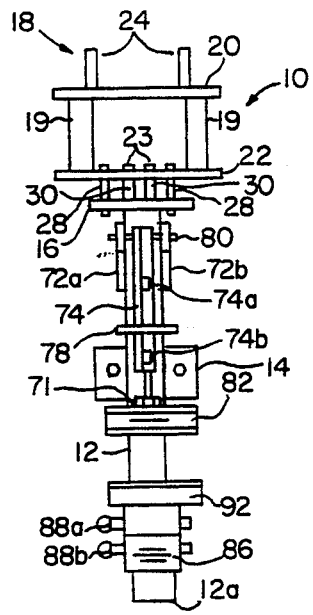
FIG. 3 is a front elevation view of the inventive pipe seal shown in FIG. 2.

Referring to FIGS. 1, 2 and 3, there are shown various elevation views of a pipe sealing apparatus 10 in accordance with the principles of the present invention. In FIG. 1, the pipe sealing apparatus 10 is shown coupled to the distal end of an articulated arm assembly 42 of a conventional backhoe 40, where the articulated arm assembly and the backhoe are shown in dotted line form. FIGS. 2 and 3 respectively show side and front elevation views of the inventive pipe sealing apparatus 10 coupled at an end thereof to an articulated arm assembly.

Backhoe 40 is conventional in design and operation and includes a plurality of wheels 44 for mobility as well as an operator's cab 46 wherein are located various controls and indicators (not shown for simplicity) to accommodate an operator of the backhoe. The articulated arm assembly 42 is also conventional in design and operation and includes a first proximal arm 48 pivotally coupled at one end to the backhoe. The angle of elevation of the first proximal arm 48 is controlled by a first hydraulic cylinder 50 which includes an extendible rod 52 coupled thereto. A distal end of extendible rod 52 is pivotally coupled to a second end of the first proximal arm 48, with the first proximal arm lowered by extension of the rod and raised by a retraction of the rod within the first hydraulic cylinder 50. Also attached to the second end of the first proximal arm 48 are a pair of spaced mounting plates 54. Pivotally attached to the second end of the first proximal arm 48 by means of the mounting plates 54 are a second distal arm 56 and a second hydraulic cylinder 60. The second hydraulic cylinder 60 also includes an extendible rod 64, where an extension of the rod lowers the second distal arm 56 and a retraction of the rod raises the second distal arm. Distal ends of each of the second arm 56 and the extendible rod 64 of the hydraulic cylinder 60 are coupled to a mounting assembly 68 by means of pivot pins 58 and 66, respectively. Mounting assembly 68 includes a plate 70. With the first proximal arm 48 and the first hydraulic cylinder 50 pivotally coupled to the frame of backhoe 40 and with the second distal arm 56 and the second hydraulic cylinder 60 pivotally coupled by means of mounting plates 54 to the second end of the first proximal arm, the mounting assembly 68 may be raised and lowered as desired.

Mounting assembly 68 is adapted to receive a mounting pin, or bolt, 26 inserted through a pair of spaced mounting flanges 24 on an upper portion of an attachment frame 18 for securely attaching the pipe sealing apparatus 10 to a distal end of the articulated arm assembly 42. Attachment frame 18 further includes a first plate 20 to which the mounting flanges 24 are attached and a second plate 22. The first and second plates 20, 22 of the attachment frame 18 securely coupled by means of a pair of spaced, parallel bars 19. Mounting flanges 24, bars 19 and the first and second plates 20, 22 are securely joined by conventional means such as weldments to form a high strength, generally rectangular structure preferably comprised of steel. Each of the mounting flanges 24 includes a respective aperture (not shown for simplicity), which apertures are aligned to receive a mounting pin 26 for securely mounting the attachment frame 18 to mounting assembly 68. When the mounting assembly 68 and the attachment frame 18 are thus coupled, mounting assembly plate 70 is in abutting contact with the first plate 20 of the attachment frame.

The second plate 22 of attachment frame 18 includes a plurality of spaced apertures along the length thereof between bars 19. Two outer apertures are each adapted to receive a respective mounting pin 28, while two inner apertures are adapted to receive a respective alignment pin 23. The pipe sealing apparatus 10 includes an elongated frame 12 and a first attachment plate 14 mounted to a lateral, intermediate portion of the frame. Similar to the second plate 22 of the attachment frame 18, the first attachment plate 14 includes a plurality of spaced apertures, with each of two outer apertures adapted to receive a respective mounting pin 28 and two inner apertures each adapted to receive a respective alignment pin 23. Pipe sealing apparatus 10 is securely mounted to the attachment frame 18 by means of the pair of mounting pins 28. Alignment pins 23 facilitate attachment of the pipe sealing apparatus 10 to the attachment frame 18 by providing proper alignment between the second plate 22 and the first attachment plate 14. Disposed about each of the alignment pins 23 and intermediate and in abutting contact with the second plate 22 and the first attachment plate 14 is a rubber bushing 30. The pair of rubber bushings 30 afford vibration damping and high impact force isolation between the pipe sealing apparatus 10 and the attachment frame 18 and articulated arm assembly 42 of the backhoe 40.

While FIG. 1 shows the pipe sealing apparatus 10 coupled to the first attachment plate 14, FIGS. 2 and 3 show the pipe sealing apparatus coupled to a second attachment plate 16 mounted to a first end of frame 12. The first and second attachment plates 14, 16 are affixed to frame 12 by conventional means such as weldments. Frame 12 is preferably comprised of a high strength steel and is generally tubular in shape and rectangular in cross-section. Also attached to frame 12 adjacent its first end are a pair of spaced mounting plates 72a and 72b as shown in FIG. 3. Mounting plates 72a, 72b include a pair of aligned apertures through which a pivot pin 80 is inserted. Pivot pin 80 is coupled to a butt end of a hydraulic cylinder 74. Hydraulic cylinder 74 includes a pair of spaced hydraulic connectors 74a and 74b, each respectively coupled to first and second hydraulic lines 34a and 34b as shown in dotted line form in FIG. 1. The hydraulic lines are omitted from the other figures for simplicity. The other end of each of the hydraulic lines 34a, 34b is coupled to a hydraulic reservoir and pump assembly 32 in backhoe 40. Hydraulic cylinder 74 further includes an extendible rod 76. Hydraulic cylinder 74 is preferably a double acting type cylinder permitting extension and retraction of the extendible rod 76 within the hydraulic cylinder. The hydraulic cylinder 74 and lines 34a, 34b may also be coupled to a manually operated hydraulic pump and reservoir combination 32a for operation independent of the backhoe's hydraulic system in an alternative embodiment. The manually operated hydraulic pump and reservoir combination 32a is preferably located close to where the backhoe operator is positioned and typically includes a manually operated handle for pressurizing the hydraulic system.

Coupled to a distal end of extendible rod 76 by means Of a coupling pin 71 is a movable sealing block 82. A distal surface of the movable sealing block 82 is generally concave for engaging the convex surface of a pipe to seal a leak in the pipe as described below. Attached to the movable sealing block 82 are a pair of spaced guide rods 84. With the first ends of each of the spaced guide rods 84 securely attached to the movable sealing block 82, second ends of each of the guide rods engage respective, opposed lateral portions of frame 12 in a sliding manner. With each of the spaced guide rods 84 engaging and freely slidable along frame 12, the guide rods maintain the movable sealing block 82 in alignment with frame 12 during extension and retraction of the hydraulic cylinder 74. Guide rods 84 thus ensure parallel tracking of the movable sealing block 82 relative to the longitudinal axis of frame 12 and alignment of the movable sealing block with a fixed block 92 discussed below. A mounting bracket 78 securely attached to frame 12 and engaging hydraulic cylinder 74 also ensures proper alignment of the hydraulic cylinder and its extendible rod 76 relative to the frame and the fixed block 92.

The pipe sealing apparatus 10 further includes a fixed bracket 86 disposed adjacent a second end of frame 12. Fixed bracket 86 has attached thereto fixed block 92 for securely engaging an outer surface of a pipe as described below. Fixed block 92 is also preferably provided with a pipe-engaging concave surface as in the movable sealing block 82. During operation, bracket 86 is maintained in a fixed position along the length of the frame 12 of the pipe sealing apparatus 10 by means of a pair of mounting pins 88a and 88b inserted through aligned apertures in the frame and the fixed bracket. However, the position of bracket 86 along the length of frame 12 may be fixed as desired depending upon the diameter of the pipe to be sealed by means of a plurality of spaced apertures 90 within the frame. Thus, mounting pins 88a, 88b are inserted through the apertures in the fixed bracket 86 as well as through a pair of apertures 90 adjacent the second end of frame 12 for larger diameter pipes, while the aforementioned mounting pins are inserted through the fixed bracket and a pair of apertures disposed toward the first end of the frame for a smaller diameter pipe. Extending in a telescoping manner from the second end of frame 12 adjacent the fixed bracket 86 is a frame extension 12a. Frame extension 12a also includes a plurality of spaced apertures and may be withdrawn from or inserted in frame 12 along the length thereof. With respective apertures in frame 12 and in its extension 12a in alignment, each of the mounting pins 88a, 88b is inserted through a pair of thus aligned apertures to securely position bracket 86 along the length of the frame. For larger diameter pipes, extension 12a is withdrawn from frame 12 and mounting pin 88a is inserted through aligned apertures in the frame 12 and in the frame extension 12a. Bracket 86 is then positioned on the frame extension 12a and mounting pin 88b is inserted through aligned apertures within the bracket and the frame extension for securely fixing the position of the bracket along the length of the frame extension. In this manner, larger diameter pipes may be accommodated by the pipe sealing apparatus 10.

Referring to FIGS. 4a, there is shown a front elevation view of a bucket mounting arrangement 110 for attaching the pipe sealing apparatus 10 to the entrenching bucket 100 (shown in dotted-line form) of a backhoe (not shown for simplicity). Side elevation views of the pipe sealing apparatus 10 mounted to the entrenching bucket 100 and respectively shown in a generally upright and a generally horizontal orientation are shown in FIGS. 4b and 4d. An exploded perspective view of the bucket mounting arrangement 110 is shown in FIG. 4c.

The bucket mounting arrangement 110 includes a generally flat, rectangular mounting plate 112 having a plurality of spaced apertures therein and adapted for secure mounting to a lateral surface of the entrenching bucket 100 by means of a plurality of nut and bolt combinations 114. Extending from the mounting plate 112 and away from the entrenching bucket 100 is a first cylindrical connecting arm 116. A second cylindrical connecting arm 118 is securely attached to the frame 12 of the pipe sealing apparatus 10 adjacent one end thereof. The cylindrically shaped first and second connecting arms 116, 118 are attached by conventional means such as weldments to mounting plate 112 and frame 12, respectively. The first and second connecting arms 116, 118 are adapted for interfitting engagement in a telescoping manner and are freely rotatable relative to one another. The first connecting arm 116 is provided with a plurality of spaced apertures 116a about the circumference thereof. Similarly, the second connecting arm 118 is provided with a plurality of spaced apertures 118a about the circumference thereof. In a preferred embodiment, four apertures are disposed about each of the first and second connecting arms 116, 118, with each aperture disposed intermediate and displaced 90° from two adjacent apertures. With the first connecting arm 116 inserted within the second connecting arm 118 in a telescoping manner and with apertures 116a aligned with apertures 118a, respective pairs of aligned apertures are adapted to receive a coupling pin 120 inserted therein. With coupling pin 120 inserted through aligned apertures 116a, 118a in the first and second connecting arms 116, 118, the frame 12 of the pipe sealing apparatus 10 is securely attached to a lateral portion of the entrenching bucket 110 and is maintained in a fixed orientation relative thereto. A retaining pin (not shown for simplicity) may be inserted through coupling pin 120 for maintaining coupling pin in position within the first and second connecting arms 116, 118.

As shown in FIG. 4b, the pipe sealing apparatus 10 may be maintained in a generally upright orientation when mounted to bucket 100, or may be positioned in a generally horizontal orientation as shown in FIG. 4d. It is also possible to orient the pipe sealing apparatus 10 in positions intermediate those illustrated in FIGS. 4b and 4d by merely removing coupling pin 120 from the first and second connecting arms 116, 118 and rotating the pipe sealing apparatus 10 relative to the bucket 100 to the desired orientation, or inclination. The preferred number of spaced apertures is four in each of the first and second connecting arms 116, 118, with additional flexibility in orienting the pipe sealing apparatus 10 in a desired orientation provided by tilting the bucket 100 by means hydraulic cylinder 60 and its extendible rod 64. A handle 122 is attached to an end of frame 12 to facilitate attaching the pipe sealing apparatus 10 to the bucket 100 and positioning the apparatus in the desired orientation.

Figure 5:
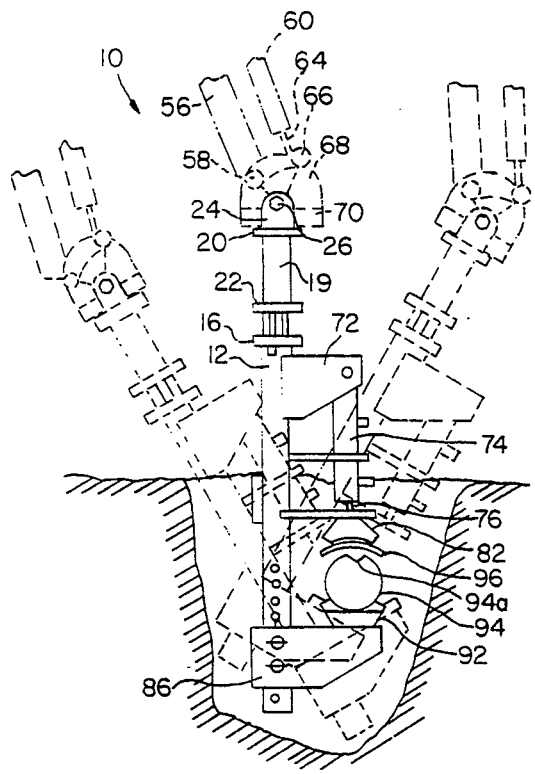
FIG. 5 is a side elevation view illustrating the inventive pipe seal in various orientations about a pipe for sealing a leak in an upper portion of the pipe.
Figure 6:
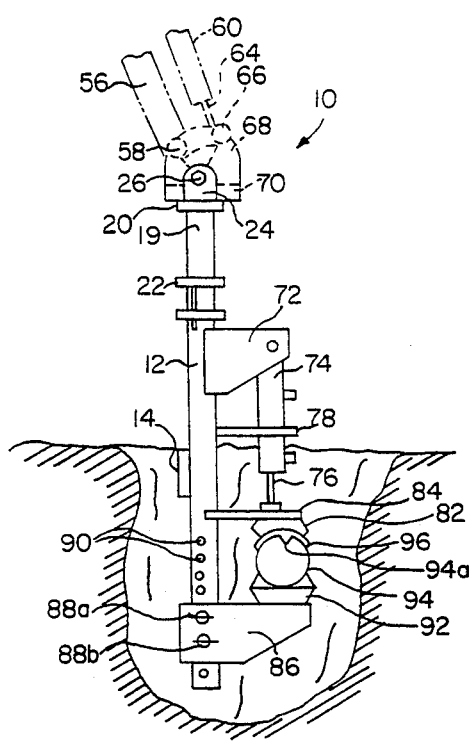
FIG. 6 is a side elevation view illustrating the manner in which the inventive pipe seal engages a pipe while in a generally vertical orientation for sealing a leak in an upper portion of the pipe.

Referring to FIG. 5, there is shown a side elevation view of the pipe sealing apparatus 10 of the present invention in various orientations relative to an underground pipe 94 having a leak, or hole, 94a therein. Where the leak 94a is disposed in the upper surface of pipe 94, the pipe sealing apparatus 10 is maintained in a generally vertical orientation as shown in solid line form in the figure. Positioning of the movable sealing block 82 over the leak 94a in pipe 94 is shown in FIG. 6, where the hydraulic cylinder 74 has caused extension of the rod 76 therefrom such that a seal pad 96 on the concave surface of the movable sealing block 82 is in tight-fitting engagement with the upper surface of the pipe 94. Seal pad 96 is preferably comprised of a resilient resinous material adapted for assuming the pipe radius and encompassing the leak area upon the application of pressure to provide a positive leak seal. While the embodiment of the pipe seal apparatus 10 shown in FIGS. 5 and 6 depicts the seal pad 96 as separate from the movable sealing block 82, the movable sealing block itself may be comprised of the aforementioned resilient resinous material to effect a positive seal of the pipe leak 94a. Such resilient resin pads are well known to those skilled in the relevant arts and are typically comprised of a urethane-type elastomer. Urethane-type elastomers provide the desired resilience and abrasion resistance to effect a long term seal of leak 94a. As shown in FIG. 6, the leak 94a is sealed by positioning the pipe 94 between and in intimate contact with the fixed block 92 and the movable sealing block 82, or an appropriate seal pad 96 disposed on the movable sealing block.

Also as shown in FIG. 5, the orientation of the pipe sealing apparatus 10 may be varied depending upon the location of the leak 94a in pipe 94. Thus, where the leak 94a is in an upper right-hand portion of the pipe 94, the mounting assembly 68 on the distal end of the articulated arm assembly is moved to the right. Rod 64 is then extended from the second hydraulic cylinder 60 to provide the pipe sealing apparatus 10 with the desired orientation. Hydraulic cylinder rod 76 is then extended to cause the movable sealing block 82 to be positioned in intimate contact with pipe 94 over the leak 94a therein. Similarly, where the leak 94a is in an upper left-hand portion of the pipe 94 as viewed in FIG. 5, the mounting assembly 68 is moved to the left by the articulated arm assembly. Rod 64 is then retracted by the second hydraulic cylinder 60 to pivot the pipe sealing apparatus 10 about pivot pin 58. This provides the pipe sealing apparatus 10 with the desired orientation for positioning the movable sealing block 82 over the leak 94a in the pipe 94.

Figure 7:
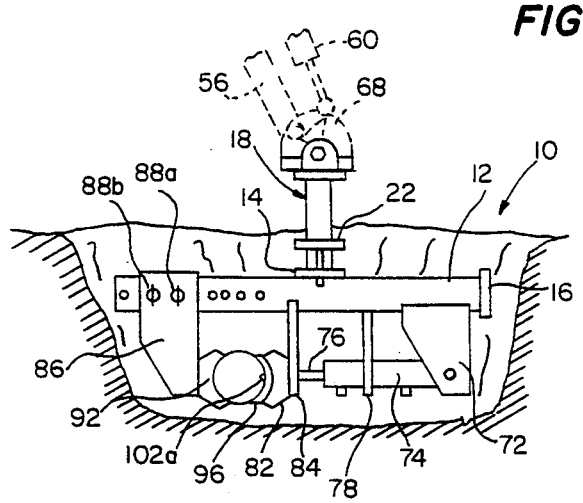
FIG. 7 is a side elevation view showing the inventive pipe seal in a generally horizontal orientation for engaging a pipe and sealing a leak in a lateral portion of the pipe.

Referring to FIG. 7, there is shown the pipe seal apparatus 10 of the present invention engaging and sealing a leak 102a in a pipe 102. In the arrangement of FIG. 7, the leak 102a is in a lateral portion of the pipe 102 and the pipe fitting apparatus 10 is oriented generally horizontally. Horizontal orientation of the pipe sealing apparatus 10 is permitted by coupling the attachment frame 18 to the first attachment plate 14. With the pipe sealing apparatus 10 oriented generally horizontally, the pipe 102 is positioned intermediate the fixed block 92 and the movable sealing block 82. The combination of seal pad 96 and movable sealing block 82 is then displaced by the hydraulic cylinder 74 for positioning in intimate contact with the pipe 102 over the leak 102a therein.

Figure 8:
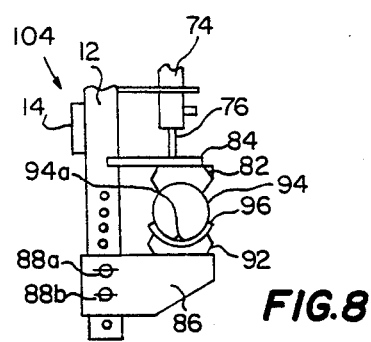
FIG. 8 is a partial side elevation view of the pipe seal of the present invention wherein the leak sealing portion is positioned below a pipe for sealing a leak in a lower portion of the pipe.

Referring to FIG. 8, there is shown a partial side elevation view of another embodiment of a pipe sealing apparatus 104 in accordance with the principles of the present invention. In the embodiment of FIG. 8, the combination of the seal pad 96 and the concave moveable sealing block 82 is attached to the fixed bracket 86. A concave block 98 is securely attached to the distal end of the extendible rod 76 of the hydraulic cylinder 74. Extension of rod 76 causes the concave block 98 to engage an upper portion of the pipe 94 to allow the seal pad 96 disposed on the concave surface of concave moveable sealing block 82 to be positioned over the leak 94a and to intimately engage a lower portion of the pipe 94 so as to seal the leak. The arrangement of FIG. 8 is particularly adapted for sealing a leak 94a on a lower portion of a pipe 94, while the arrangement of FIG. 6 is particularly adapted for sealing a leak on an upper portion of the pipe.

Figure 9:
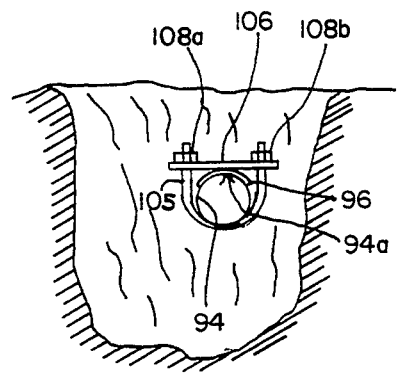
FIG. 9 is a sectional view of a pipe with a leak showing the manner in which a pad is maintained in position over the leak for sealing the leak.

Referring to FIG. 9, there is shown a sectional view of the pipe 94 having a leak 94a therein over which a seal pad 96 is disposed for sealing the leak. Seal pad 96 and a second pad 96a are securely maintained in position by means of the combination of a U-bolt 104 disposed about pipe 94 and a clamp member 106. Clamp member 106 includes a pair of spaced apertures, each disposed adjacent an end thereof and adapted to receive a threaded end of the U-bolt 104. A pair of nuts 108a and 108b maintains the clamp member 106 securely attached to the U-bolt 104 and in contact with seal pad 96 over the leak 94a in pipe 94. As described above, a sealing block comprised of a suitable resilient resinous material may be maintained in position over the leak 94a by the U-bolt 104 and clamp member 106 combination in an alternative embodiment. For permanently sealing leak 94a, a permanent split sleeve is preferably attached to pipe 94 over the leak, although this is not shown in the figure for simplicity.

There has thus been shown an apparatus for sealing a pipe having a gas or fluid leak by means of a single worker remotely positioned from the leak site. The apparatus includes a frame to which is attached a first movable block and a second fixed block, each adapted to securely engage opposed surfaces of a pipe. The first block is displaced by means of a hydraulic cylinder, allowing the blocks to securely engage and cover portions of the pipe. With one of the blocks disposed over the leak, applying hydraulic pressure seals the leak. The frame includes a first end mounted plate and a second side mounted plate for attaching the apparatus to the end of an articulated support arm such as in a backhoe. The two mounting plates permit the pipe sealing apparatus to be oriented generally vertically or generally horizontally for sealing a leak in an upper or lower portion of the pipe or in a lateral portion of the pipe, respectively. The pipe engaging pads may be comprised of a resilient resinous material for completely encompassing the leak area and effectively sealing the leak.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for sealing a leak in a pipe, said apparatus comprising:
   an elongated frame;
   first and second discrete mounting means coupled to and at spaced locations on said frame for individually and separately attaching said frame to an articulated arm, said first mounting means enabling said frame to be oriented in a generally horizontal orientation or one slightly angled from the horizontal and said second mounting means enabling said frame to be oriented in a generally vertical orientation or one slightly angled from the vertical, whereby said articulated arm provides support for and allows for movement of said frame;
   first and second pipe engaging blocks, wherein said second pipe engaging block is fixedly attached to said frame; and hydraulic means mounted to said frame and coupled to said first pipe engaging block for positioning and applying pressure to said first pipe engaging block, with either said first or second pipe engaging block disposed over a leak for sealing a leak in an upper or lower portion of a pipe when said frame is oriented generally vertical or for sealing a leak in a lateral portion of a pipe when said frame is generally horizontal, and wherein at least one of said first and second pipe engaging blocks disposed over the leak is comprised of a resilient, compressible material for encompassing and sealing the leak.

2. The apparatus of claim 1 wherein said first mounting means is attached to a lateral portion of said frame for use when said frame is in the generally horizontal orientation and said second mounting means is attached to an end of said frame for use when said frame is oriented generally vertical.

3. The apparatus of claim 2 wherein each of said first and second mounting means includes, in combination, a mounting bracket and coupling bolts.

4. The apparatus of claim 3 wherein each of said first and second mounting means further includes resilient means for cushioning attachment of said frame to said articulated arm.

5. The apparatus of claim 1 further comprising alignment means coupling said first pipe engaging block to said frame for maintaining said first mid second pipe engaging blocks in alignment as said first pipe engaging block is displaced by said hydraulic means.

6. The apparatus of claim 5 wherein said alignment means includes at least one spacer rod coupled between said first pipe engaging block and said frame.

7. The apparatus of claim 1 further comprising adjustable positioning means for adjusting the position of said second pipe engaging block on said frame in accordance with the size of the pipe.

8. The apparatus of claim 7 herein said frame includes an extendible bar coupled to an end thereof in a telescoping manner, and wherein said second pipe engaging block is coupled to said extendible bar to permit the position of said second pipe engaging block and the spacing between said first and second blocks to be established in accordance with the size of the pipe.

9. The apparatus of claim 1 wherein said resilient, compressible material is resin.

10. The apparatus of claim 9 further in combination with a U-bolt clamp for maintaining the pipe engaging block disposed over the leak in sealed engagement with the pipe over the leak when said apparatus is removed.

11. The apparatus of claim 10 further in combination with a split sleeve which is adapted to be securely attached to the pipe over the leak therein.

12. The apparatus of claim 1 wherein said hydraulic means includes a hydraulic cylinder with an extendible rod coupled to said first pipe engaging block.

13. The apparatus of claim 12 wherein said frame is adapted to be coupled to the articulated arm of a backhoe and said hydraulic means is adapted to be coupled to a hydraulic pump and a reservoir forming a portion of a hydraulic system of said backhoe.

14. The apparatus of claim 12 wherein said hydraulic means further includes a reservoir and hand-operated pump coupled to said hydraulic cylinder for applying pressure thereto.

15. The apparatus of claim 1 wherein when said second pipe engaging block is placed over the leak in the pipe, said first pipe engaging block is positioned on an opposing surface of the pipe such that when pressure is applied by said hydraulic means, said second pipe engaging block seals the leak.

* * * * *